United States Patent
Oonishi (10) Patent No.: US 11,264,705 B2
(45) Date of Patent: Mar. 1, 2022

(54) ANTENNA APPARATUS

(71) Applicant: Hitachi, Ltd., Tokyo (JP)

(72) Inventor: Masami Oonishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/010,927

(22) Filed: Sep. 3, 2020

(65) Prior Publication Data

US 2021/0091458 A1 Mar. 25, 2021

(30) Foreign Application Priority Data

Sep. 20, 2019 (JP) .............................. JP2019-171391

(51) Int. Cl.
*H01Q 21/00* (2006.01)
*H01Q 1/24* (2006.01)
*H01Q 9/04* (2006.01)
*H01Q 1/12* (2006.01)

(52) U.S. Cl.
CPC ........... *H01Q 1/246* (2013.01); *H01Q 1/1221* (2013.01); *H01Q 9/0428* (2013.01)

(58) Field of Classification Search
CPC .... H01Q 1/1221; H01Q 1/246; H01Q 9/0428; H01Q 21/00
See application file for complete search history.

(56) References Cited

U.S. PATENT DOCUMENTS

| | | | | |
|---|---|---|---|---|
| 2004/0110469 A1* | 6/2004 | Judd | ....................... | G01S 19/25 455/15 |
| 2008/0191961 A1* | 8/2008 | Tuttle | ................. | H04B 7/15507 343/893 |
| 2008/0200116 A1* | 8/2008 | Raffaelli | ................... | H01Q 1/52 455/7 |
| 2019/0289560 A1* | 9/2019 | Black | ................... | H04B 17/318 |
| 2020/0280127 A1* | 9/2020 | Hormis | ..................... | H04B 7/10 |

FOREIGN PATENT DOCUMENTS

| | | | | |
|---|---|---|---|---|
| JP | H11163773 A | * | 6/1999 | ............... H04B 7/15 |
| JP | 2004-072154 A | | 3/2004 | |

* cited by examiner

*Primary Examiner* — Hoang V Nguyen
(74) *Attorney, Agent, or Firm* — Baker Botts L.L.P.

(57) ABSTRACT

The antenna apparatus has a base station installed in a first space partitioned by a wall, a radio terminal provided in a second space, and a repeater including passive antennas and installed on the wall. The repeater is constituted of a first antenna that transmits and receives signals to and from a base station, a plurality of second antennas that transmit and receive the signals to and from the radio terminal, and a transmission line that connects the first antenna with the second antenna. Further, the plurality of second antennas are installed such that planes of polarization of the second antennas are different from each other to improve transmission with the radio terminal.

7 Claims, 7 Drawing Sheets

ANTENNA APPARATUS

BACKGROUND OF THE INVENTION

1. Field of the Invention

The present invention relates to an antenna apparatus provided with a repeater.

2. Description of the Related Art

In the network infrastructure that supports the Internet of Things (IoT) services, stable communication between a base station and a large number of radio terminals is essential. In the communication as such, if there is a radio wave obstacle such as a metal wall between the base station and the radio terminal, it becomes difficult for radio waves to reach the radio terminal and communication cannot be performed well. Recently, a delivery service system and the like is appearing in which information such as the temperature and humidity of items in refrigerated warehouses and refrigerated cars is communicated from radio terminals to a base station and is notified to a delivery center and the like via the base station. In such a case, because the items and the radio terminals are arranged in a closed space surrounded by the metal walls, a communication state between the radio terminals and the base station becomes extremely poor. In other words, in the communication from the base station to the radio terminals and the communication from the radio terminals to the base station, the radio waves are attenuated by a large amount due to the wall (radio wave obstacle), and there occurs a radio communication failure such as unable to conduct long-distance communication.

In such a case, conventionally, in order to improve transmission and reception of the radio waves between the base station and a large number of radio terminals in the closed space, a repeater has started to be provided between the base station and the radio terminals. For example, JP 2004-72154 A discloses a no power-feeding passive repeater (repeater antenna) which is provided to improve radio communication between a mobile phone located in the basement, at a place surrounded by a metal structure, or the like, and a base station installed in the external space, by providing antennas on the outer side and the inner side, respectively, and connecting between the antennas with a coaxial cable.

SUMMARY OF THE INVENTION

The technique of JP 2004-72154 A has advantages such as a facility for supplying electric power is not required because the repeater is realized without power feeding, a structure is simple, and maintenance is easy.

However, even if the repeater is installed, there has been a problem that signals cannot be received well in the closed space such as the refrigerated warehouse and the refrigerated car, because the reception power deteriorates due to electromagnetic waves being repeatedly reflected to generate locations where the electromagnetic waves are strengthened and weakened, and a polarization of the electromagnetic wave rotates to cause a signal whose plane of polarization is changed to be received by the fixed antenna.

Therefore, an object of the present invention is to provide an antenna apparatus that improves the transmission and reception of the radio waves between the base station and the radio terminals even when the base station and the radio terminals are separated by a wall.

To solve the above problems, the present invention is, by way of example, an antenna apparatus including a wall separating a first space and a second space, a base station installed in the first space, a large number of radio terminals installed in the second space, and a repeater attached to the wall and relaying communication radio waves between the base station and the radio terminals. The repeater is constituted of a first antenna provided on a side of the first space, a second antenna provided on a side of the second space, and a transmission line that connects the first antenna with the second antenna. Further, the second antenna has characteristics of being able to receive a circularly polarized wave or a plurality of planes of polarization.

According to the present invention, the radio waves can be guided from the first space to the second space to improve radio wave reception of the radio terminals, and the radio waves output from the radio terminals can be transmitted to the external space satisfactorily.

DESCRIPTION OF THE PREFERRED EMBODIMENTS

Hereinafter, the present invention is described in detail using specific embodiments with reference to the drawings. The present invention is not limited to the embodiments described below. Further, in each of the drawings, the same constituent elements may be denoted by the same reference numerals, and redundant description of the constituent elements already described may be omitted.

First Embodiment

Figure 1:
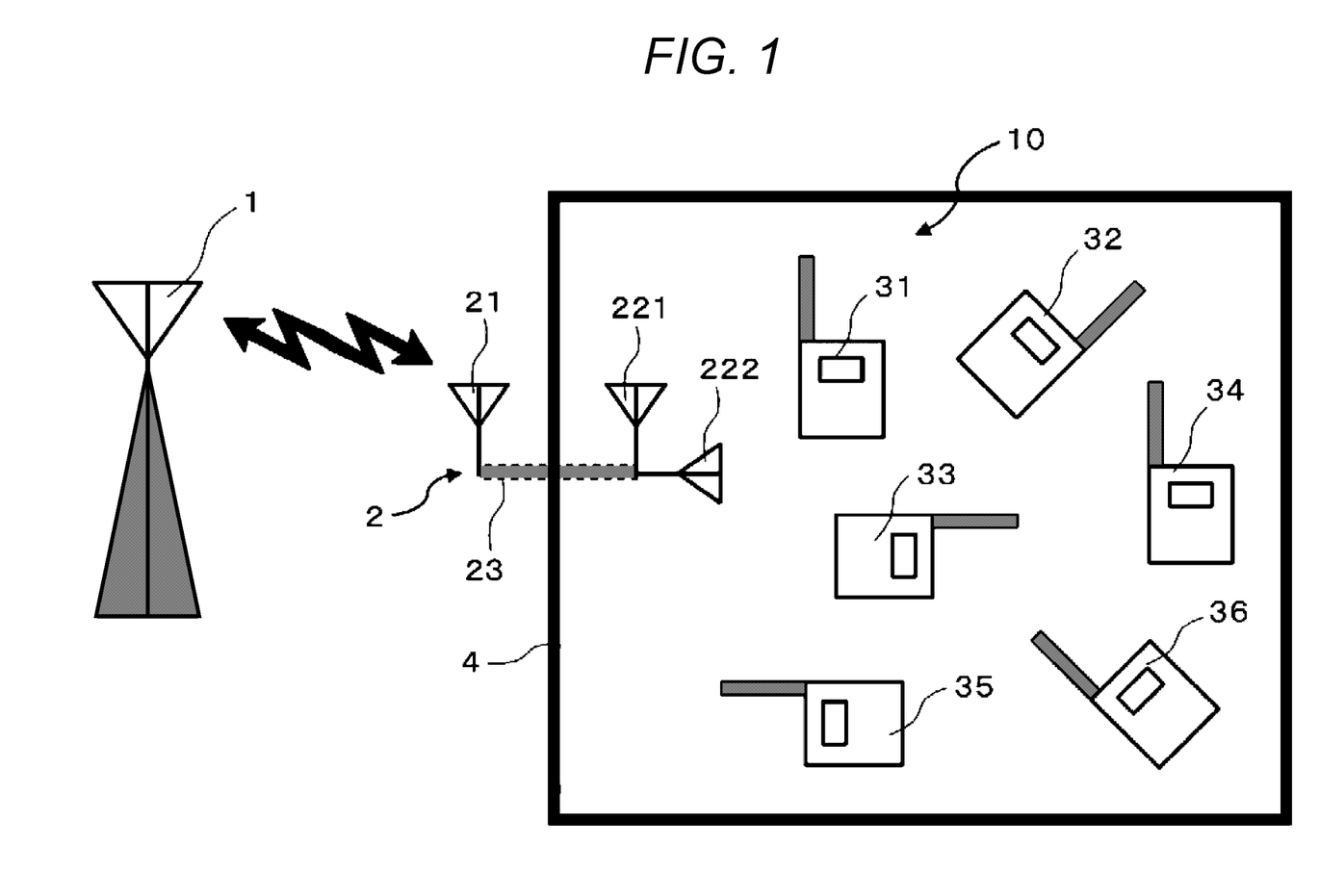
FIG. 1 is a diagram showing a configuration example of an antenna apparatus according to a first embodiment of the present invention.
Figure 2:
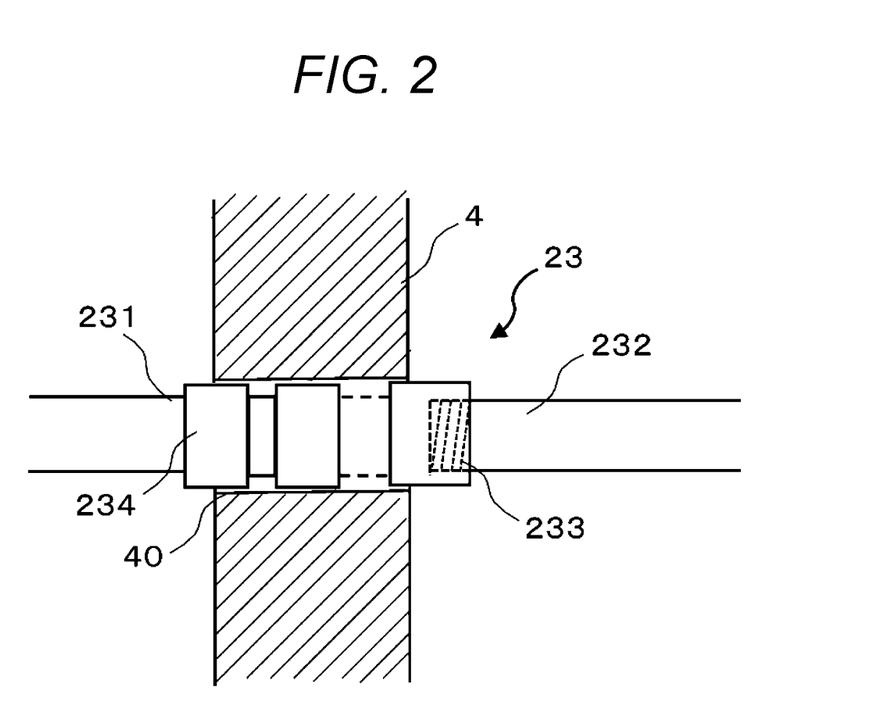
FIG. 2 is a diagram showing a configuration example of a transmission line of a repeater according to the first embodiment.

First, a first embodiment of the present invention is described with reference to FIGS. 1 and 2. FIG. 1 is a diagram showing the configuration of an antenna apparatus according to the first embodiment. FIG. 2 is a diagram showing in detail a part of a transmission line of a repeater in FIG. 1.

In FIG. 1, reference numeral 1 denotes a base station for performing radio communication with radio terminals 31 to 36, and is installed in an external space being a first space. Reference numeral 2 denotes a repeater that relays radio waves for performing communication between the base station 1 and the radio terminals 31 to 36. Reference numeral 4 denotes a wall of a refrigerator, a freezer or the like, and this wall forms a closed space 10 being a second space.

The repeater 2 includes a first antenna 21 installed on the side of the external space (first space), two sets of second antennas 221 and 222 installed in the closed space 10 (second space), and a transmission line 23 that connects the first antenna 21 and two sets of the second antennas 221 and 222. In this embodiment, the first antenna 21 and two sets of the second antennas 221 and 222 are passive antennas, and do not require electric power during operation. Although two sets of the second antennas are used in this example, three or more sets may be used.

The radio terminals 31 to 36 are installed in the closed space 10 and perform radio communication with the base station 1 in the external space via the repeater 2.

In this embodiment, the radio terminals 31 to 36 use a Low-Power Wide-Area Network (LPWA) system, which is a system using a wireless local area network (LAN), or the like. Although six radio terminals are installed here, the number of the terminals may be any number, as necessary.

Note that the wall 4 forming the closed space 10 is made of metal such as iron or aluminum, and has properties of blocking (attenuating) the propagation of radio waves. Although depending on the material and thickness of the wall 4, the radio wave propagation from the inside of the closed space 10 to the external space is extremely attenuated by −40 to −80 dB, making a signal difficult to reach the base station 1. Therefore, in order to suppress the attenuation, in other words, to improve transmission of radio waves from the internal closed space (second space) to the external space (first space), and conversely, to improve transmission of radio waves from the external space (first space) to the internal closed space (second space), the repeater 2 is provided to suppress the attenuation of the radio waves. The radio waves emitted from the radio terminals 31 to 36 are received by the second antennas 221 and 222, emitted via the transmission line 23 from the first antenna 21, and reach the base station 1. Further, the radio waves from the base station 1 are received by the first antenna 21 of the repeater 2, emitted via the transmission line 23 from the second antennas 221 and 222, and can be received by the radio terminals 31 to 36.

However, when a large number of radio terminals 31 to 36 are randomly installed inside the closed space 10 as shown in FIG. 1, planes of polarization of the antennas are oriented in various directions. Furthermore, regarding a signal output from each of the radio terminals, the plane of polarization rotates by the electromagnetic wave being repeatedly reflected inside the electromagnetically closed space 10.

Therefore, the second antennas 221 and 222 of the repeater according to the first embodiment are arranged such that the planes of polarization of the respective antennas are different from each other. In this way, by making the planes of polarization of the second antenna 221 and the second antenna 222 different from each other, the signals transmitted from the large number of radio terminals 31 to 36 can be propagated in a state of the attenuation being small as long as the planes of polarization of the signals match. Although depending on the characteristics of the antenna used, it has been confirmed that the configuration as shown in FIG. 1 improves the attenuation by about 70 dB at maximum with the attenuation of up to about −10 to −16 dB. In this embodiment, two sets of the second antennas 221 and 222 are used in the configuration; however, if the second antenna that can receive more planes of polarization is added, the attenuation can be further reduced.

Next, a specific configuration of the transmission line 23 of the repeater 2 is described with reference to FIG. 2. Note that the first antenna and the second antennas are omitted in FIG. 2. The transmission line 23 in FIG. 2 has a filter function for suppressing passage of signals of unnecessary frequencies. Further, in order to facilitate the work of attaching the repeater on the wall 4, the transmission line is divided into two and these transmission lines are connected by a connector.

First, the filter function is described. The first antenna in the repeater not only receives a radio wave signal of a predetermined frequency from the original base station, but also receives radio wave signals of other frequencies that are completely unrelated. When this unnecessary radio wave signals are transmitted to the second antennas on the inner side, the radio wave signals are transmitted to the plurality of terminals in the inside, which increases the risk that normal communication cannot be performed. Therefore, the transmission line 23 is equipped with a filter function of adjusting the impedance of the transmission line to block the unnecessary radio signals. That is, in FIG. 2, a part of a transmission line 231 is provided with a portion 234 having a different diameter to constitute a structure for adjusting the impedance, and this adjustment of the impedance allows the signals of the necessary frequency to pass therethrough and suppresses the signals of unnecessary frequencies from passing therethrough. In the above, the diameter of the transmission line is changed to adjust the impedance; however, the present invention is not limited to this, and another method may be used. For example, instead of changing the diameter of the cross section, members having different values of impedance may be used in combination.

Next, referring to FIG. 2, a configuration for facilitating the work of attaching the repeater is described. The repeater 2 is configured by drilling a small attachment hole 40 in a part of the wall 4, passing the transmission line 23 through the hole, connecting the first antenna on the outer side to one end of the transmission line 23, and connecting the second antennas to the other end of the transmission line 23. However, for example, it is quite difficult to make the small hole 40 in a side surface of the wall 4 of a freezer of a refrigerated truck, pass a transmission line through the hole 40, and further attach antennas to both ends of the hole. Therefore, in this example, the transmission line 23 is divided into the transmission line 231 and a transmission line 232, and these transmission lines are connected by a connector 233 outside the wall 4. That is, the first antenna is connected to one of the transmission lines, and the second antennas are connected to another one of the transmission lines. Then, one of the transmission lines is passed through the hole, and the other of the transmission lines is connected with the connector on the outside of the wall 4. By adopting this structure, the attachment work becomes easy.

As described above, according to the first embodiment of the present invention, because the repeater is installed so that the second antennas have different planes of polarization and the transmission and reception between the second antennas and the radio terminals can be improved, the transmission and reception between the base station and the radio terminals via the repeater can be improved. In addition, because the antennas used for the repeater are passive antennas, power supply is unnecessary, and therefore, the structure becomes simple and the cost can be reduced. Furthermore, the unnecessary radio waves can be suppressed from being transmitted to the radio terminals by adjusting the impedance of the transmission line of the repeater. Also, the work of attaching the repeater can be reduced.

Second Embodiment

Figure 3:
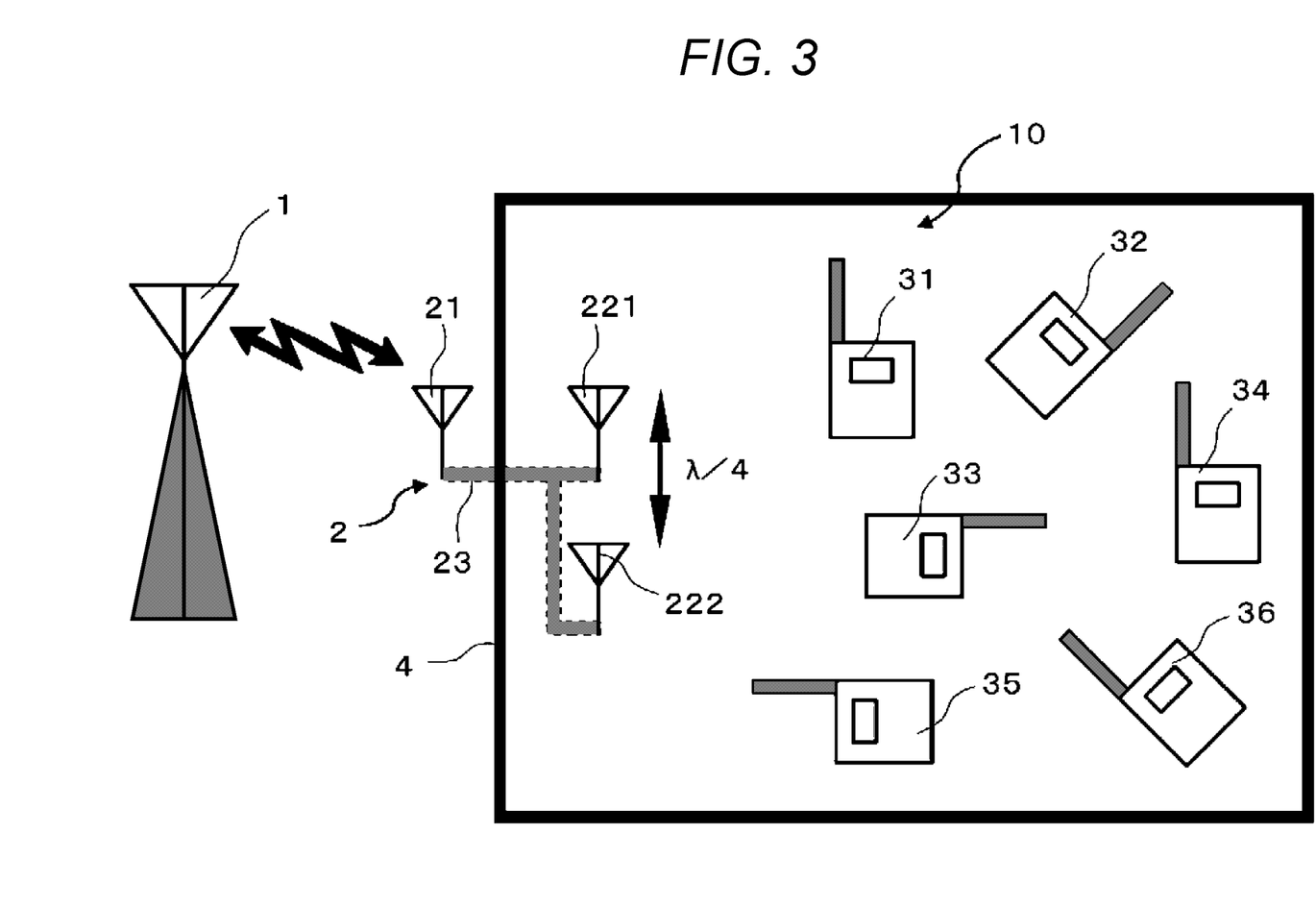
FIG. 3 is a diagram showing a configuration example of an antenna apparatus according to a second embodiment of the present invention.

Next, a second embodiment of the present invention is described. FIG. 3 is a diagram showing a configuration example of an antenna apparatus according to the second embodiment of the present invention.

The second embodiment has a common configuration in many points with the above-described first embodiment, and the description of the contents already described is omitted and the different contents are mainly described.

In the second embodiment, installation positions of second antennas of the repeater 2 are different from those of the first embodiment in that, with respect to the wavelength $\lambda$ of the frequency to be used, the installation positions are set different by $\lambda/4$ (¼ wavelength). With this configuration, the signals transmitted from the radio terminals 31 to 36 can be transmitted and received by either of two sets of the second antennas 221 and 222. That is, the transmission and reception performance is further improved by not only making the planes of polarization different but also making the installation positions of the two second antennas different by ¼ wavelength. Also in this embodiment, by installing more second antennas, better transmission and reception between the second antennas and the radio terminals can be realized. In addition, also in the second embodiment, the transmission line may have a configuration as shown in FIG. 2.

Third Embodiment

Figure 4:
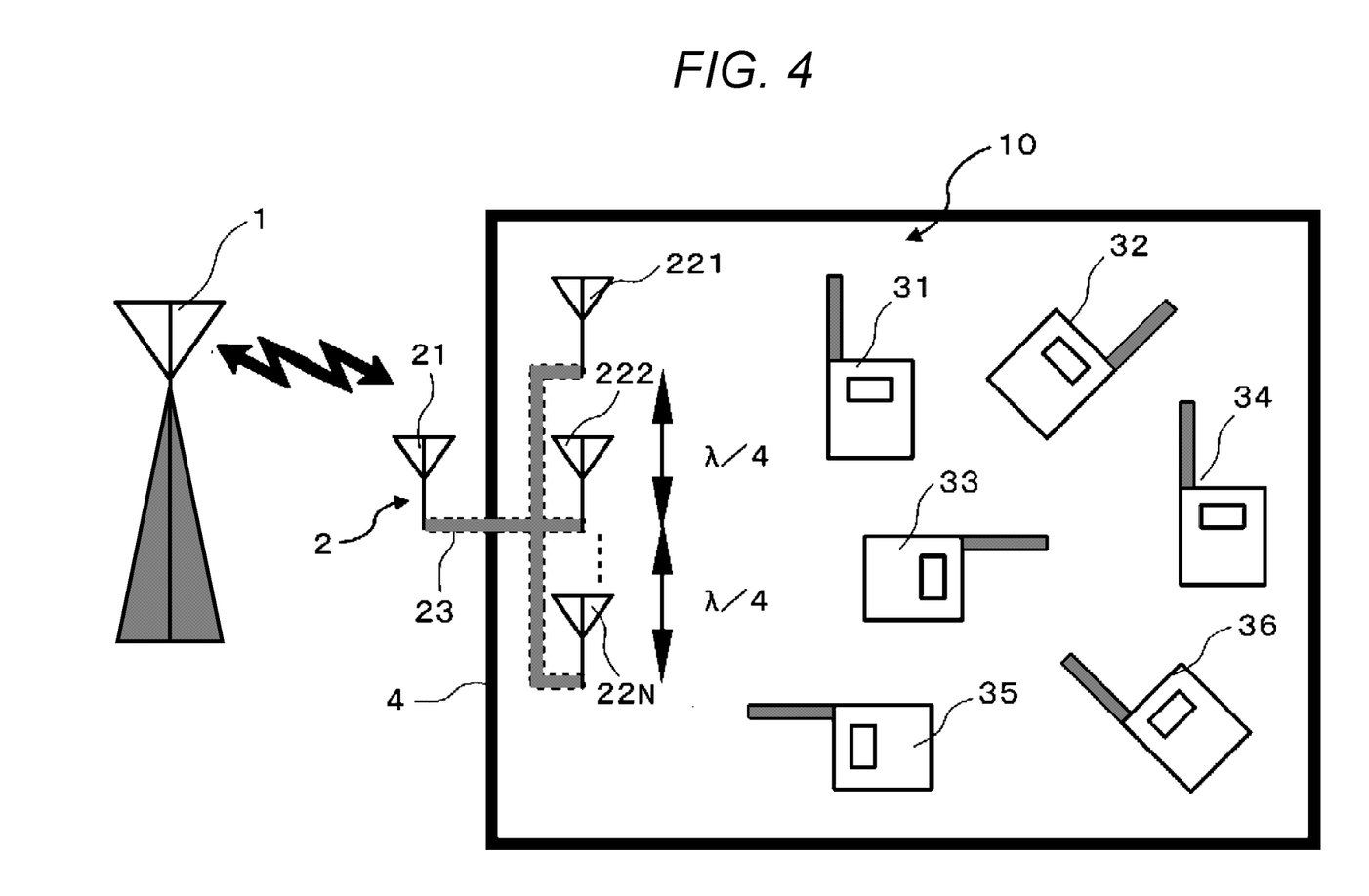
FIG. 4 is a diagram showing a configuration example of an antenna apparatus according to a third embodiment of the present invention.

Next, a third embodiment of the present invention is described. FIG. 4 is a diagram showing a configuration example of an antenna apparatus according to the third embodiment of the present invention.

The third embodiment has a common configuration in many points with the above-described second embodiment, and the description of the contents already described is omitted and the different contents are mainly described.

In the second embodiment, two sets of the second antennas are installed, whereas in the third embodiment, N sets of second antennas are installed as shown by 221, 222, . . . 22N. The distance between the installation positions of the second antennas is different by ¼ wavelength. Having the installation positions with ¼ wavelength difference does not mean that all the antennas are set to have the ¼ wavelength difference, but it means that the sets having the installation positions with ¼ wavelength difference are realized as much as possible. In FIG. 4, the antennas are installed in a straight line along the vertical direction. However, by installing the antennas in a horizontal direction, in direction having the vertical and horizontal directions mixed, and further, in a diagonal direction, transmission and reception become possible by any of N pieces of the second antennas at positions generated in the vertical and horizontal directions in FIG. 4 where the electromagnetic waves are strengthened with each other. This allows the large number of radio terminals 31 to 36 placed inside the electromagnetically closed space 10 to extend communication distance with the base station 1 installed in the external space and to stably perform transmission and reception therewith. In addition, also in the third embodiment, the transmission line may have a configuration as shown in FIG. 2.

Fourth Embodiment

Figure 5:
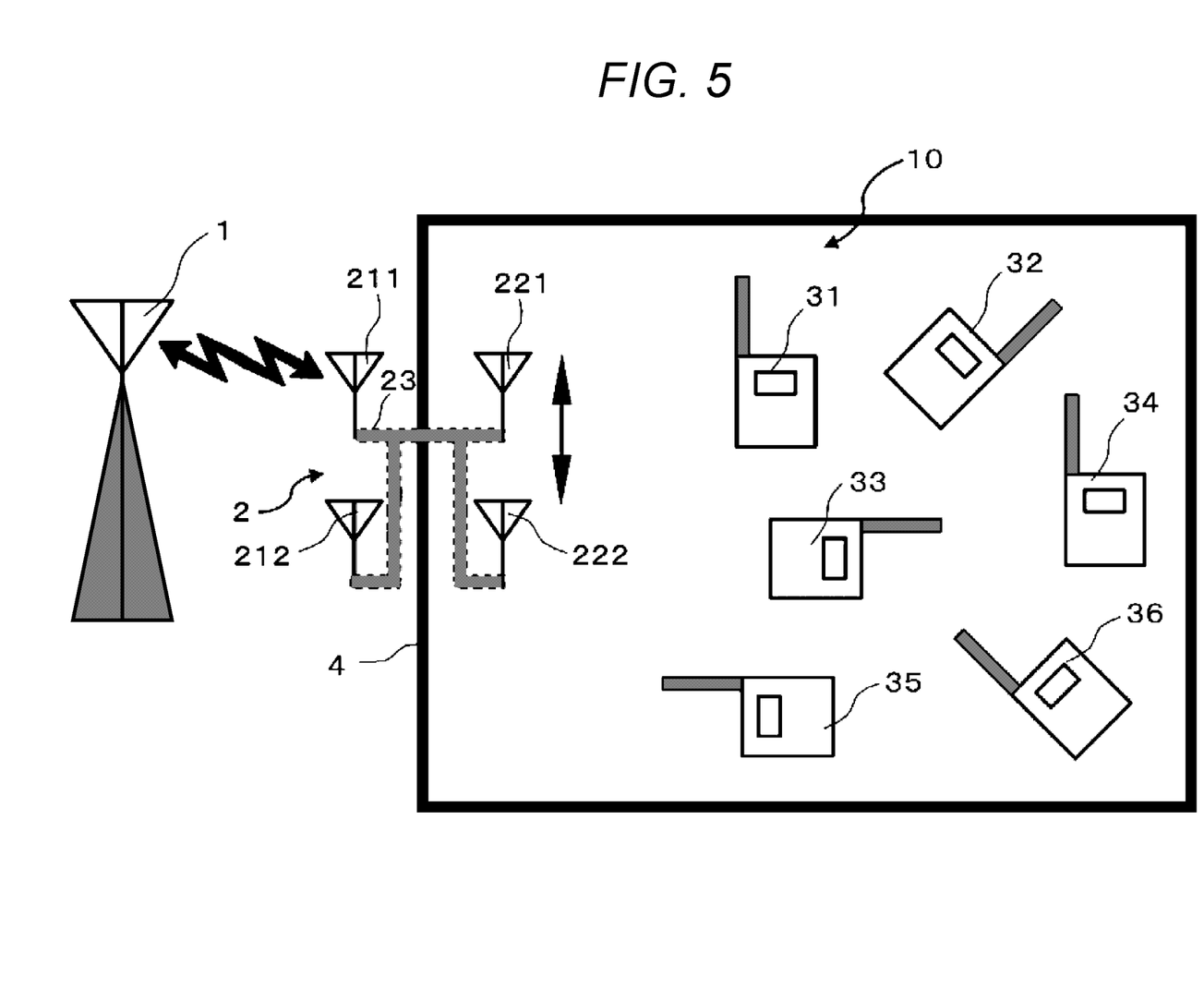
FIG. 5 is a diagram showing a configuration example of an antenna apparatus in a fourth embodiment of the present invention.

Next, a fourth embodiment of the present invention is described. FIG. 5 is a diagram showing a configuration example of an antenna apparatus according to the fourth embodiment of the present invention.

The fourth embodiment has a common configuration in many points with the above-described second embodiment, and the description of the contents already described is omitted and the different contents are mainly described.

In the second embodiment described above, one set of the first antenna 21 is installed; however, the fourth embodiment is different therefrom in that two sets of first antennas 211 and 212 are installed. Other parts are the same as in the second embodiment.

By installing two sets of the first antennas 211 and 212, the situations can be handled in which the electromagnetic waves are repeatedly reflected in the external space to generate the positions where the electromagnetic waves are strengthened or weakened with each other, and in which the electromagnetic waves are repeatedly reflected to cause the planes of polarization to rotate. As a result, the radio terminals 31 to 36 placed inside the closed space 10 (second space) can extend the communicable distance and perform stable transmission and reception with the base station 1 installed in the external space (first space). In addition, also in the fourth embodiment, the transmission line may have a configuration as shown in FIG. 2.

Fifth Embodiment

Figure 6:
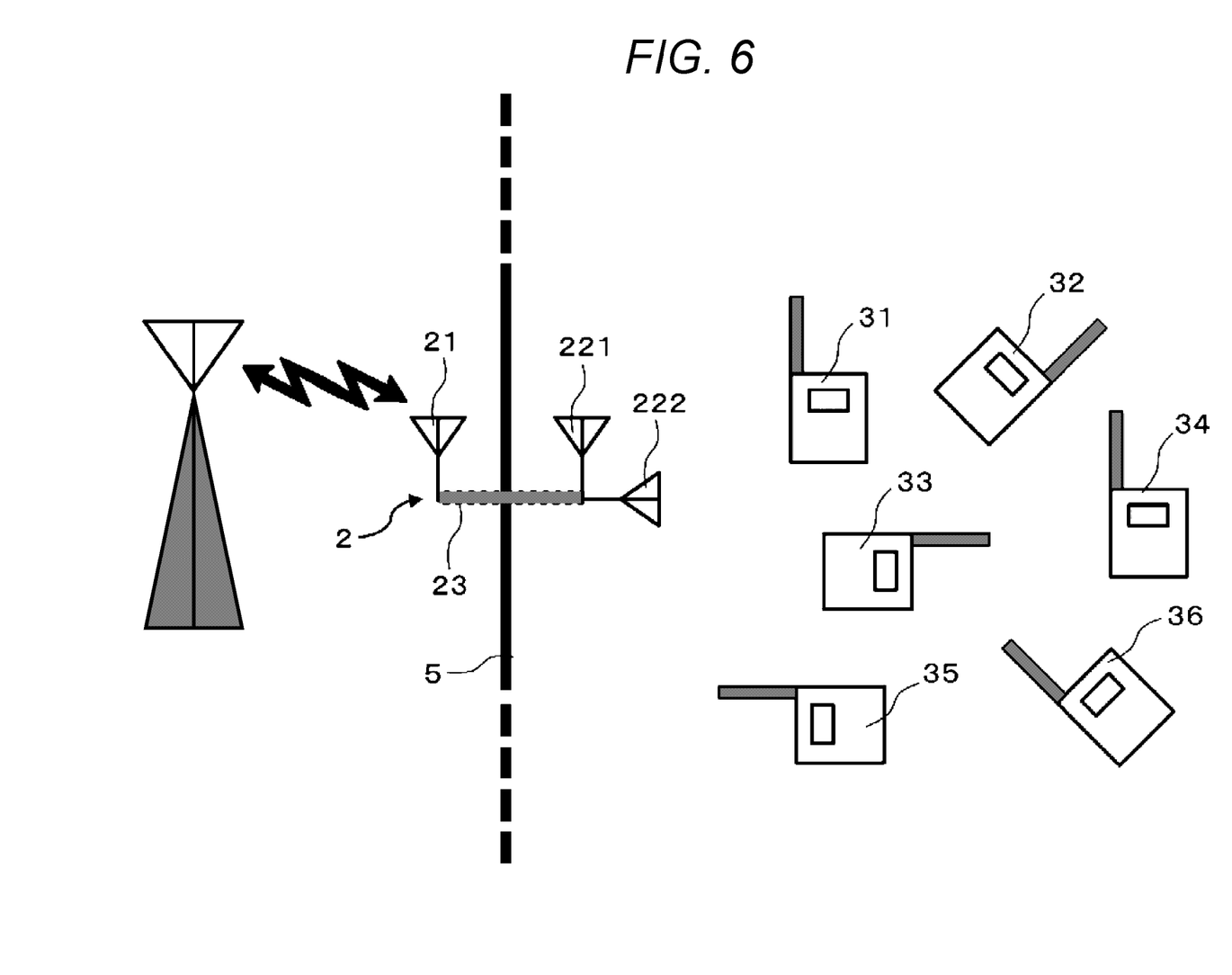
FIG. 6 is a diagram showing a configuration example of an antenna apparatus in a fifth embodiment of the present invention.

Next, a fifth embodiment of the present invention is described. FIG. 6 is a diagram showing a configuration example of an antenna apparatus according to the fifth embodiment of the present invention.

The fifth embodiment has a common configuration to the above-described first embodiment in almost all respects, and a description of the contents already described is omitted and different contents are mainly described.

The difference between the two embodiments is that the wall 4 forms the closed space 10 in the first embodiment, whereas the wall 4 partitions two spaces in the fifth embodiment. The present invention can be applied not only to a configuration in which the repeater 2 is installed between the external space and the closed space, but can also be applied to the case in which the wall separating the two spaces is provided. Also in the fifth embodiment, communication between the base station 1 and the radio terminals 31 to 36 can be improved. In addition, also in the fifth embodiment, the transmission line may have a configuration as shown in FIG. 2.

Sixth Embodiment

Figure 7:
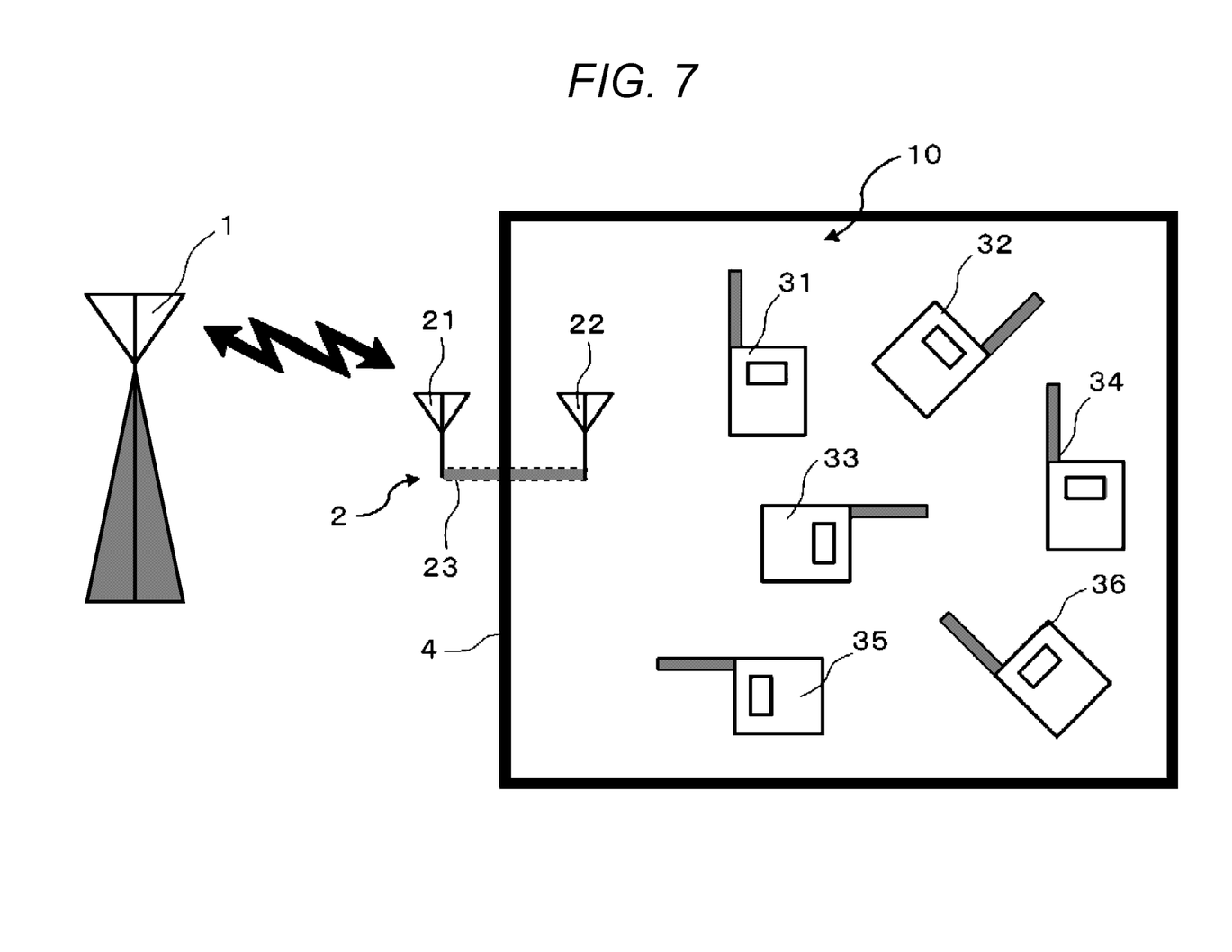
FIG. 7 is a diagram showing a configuration example of an antenna apparatus in a sixth embodiment of the present invention.

Next, a sixth embodiment of the present invention is described. FIG. 7 is a diagram showing a configuration example of an antenna apparatus according to the sixth embodiment of the present invention.

The sixth embodiment has a common configuration to the above-described first embodiment in almost all respects, and a description of the contents already described is omitted and different contents are mainly described.

If the plane of polarization of a second antenna 22 matches with the planes of polarization of the signals transmitted from the large number of radio terminals 31 to 36, the propagation of signals becomes possible with the minimum attenuation. However, if the plane of polarization is shifted by an angle of 90 degrees, this causes an extremely large attenuation, and the propagation of the signals becomes extremely difficult. Therefore, in this embodiment, by making the second antenna 22 a circular polarization antenna, the communicable distance between the radio terminals 31 to 36 and the base station 1 can be extended, and the stable transmission and reception can be performed. In addition, also in the sixth embodiment, the transmission line may have a configuration as shown in FIG. 2.

Other Embodiments

The present invention is not limited to the above-described embodiments of the present invention, and various modifications are included within the scope of the technical idea of the present invention. For example, the above-described embodiments have been described in detail in order to explain the present invention in an easy-to-understand manner, and are not necessarily limited to those including all the configurations described. Further, a part of the configuration of one embodiment can be replaced with the configuration of another embodiment, and another configuration can be added.

What is claimed is:

1. An antenna apparatus comprising:
a wall partitioning a first space and a second space; a base station installed in the first space; a plurality of radio terminals installed in the second space; and a repeater attached to the wall and repeating a communication radio wave between the base station and the radio terminal,
wherein the repeater includes a first antenna provided on a side of the first space, a second antenna provided on a side of the second space, and a transmission line connecting the first antenna and the second antenna,
wherein the antenna apparatus uses the second antenna having characteristics of being able to receive a circular polarization wave or a plurality of planes of polarization, and
wherein the transmission line is divided into two, and the transmission lines that are divided are connected by a connector.

2. The antenna apparatus according to claim 1,
wherein the first antenna and the second antenna are constituted of passive antennas.

3. The antenna apparatus according to claim 1,
wherein the second antenna is provided in a plurality of sets, and the plurality of the second antennas are installed such that planes of polarization of the plurality of second antennas are different from each other.

4. The antenna apparatus according to claim 1,
wherein the first antenna and the second antenna are passive antennas, the second antenna is provided in a plurality of sets, and the plurality of second antennas are installed such that a distance between the plurality of second antennas adjacent to each other are separated by ¼ wavelength of a communication frequency.

5. The antenna apparatus according to claim 1,
wherein the transmission line has a filter function of reducing passage of unnecessary radio waves by combining members having portions with different values of impedance.

6. The antenna apparatus according to claim 1,
wherein the second antenna is a circularly polarized antenna.

7. The antenna apparatus according to claim 1, further comprising a plurality of second antennas, wherein the plurality of second antennas are arranged in a diagonal direction.

* * * * *